United States Patent Office 3,304,545
Patented Feb. 14, 1967

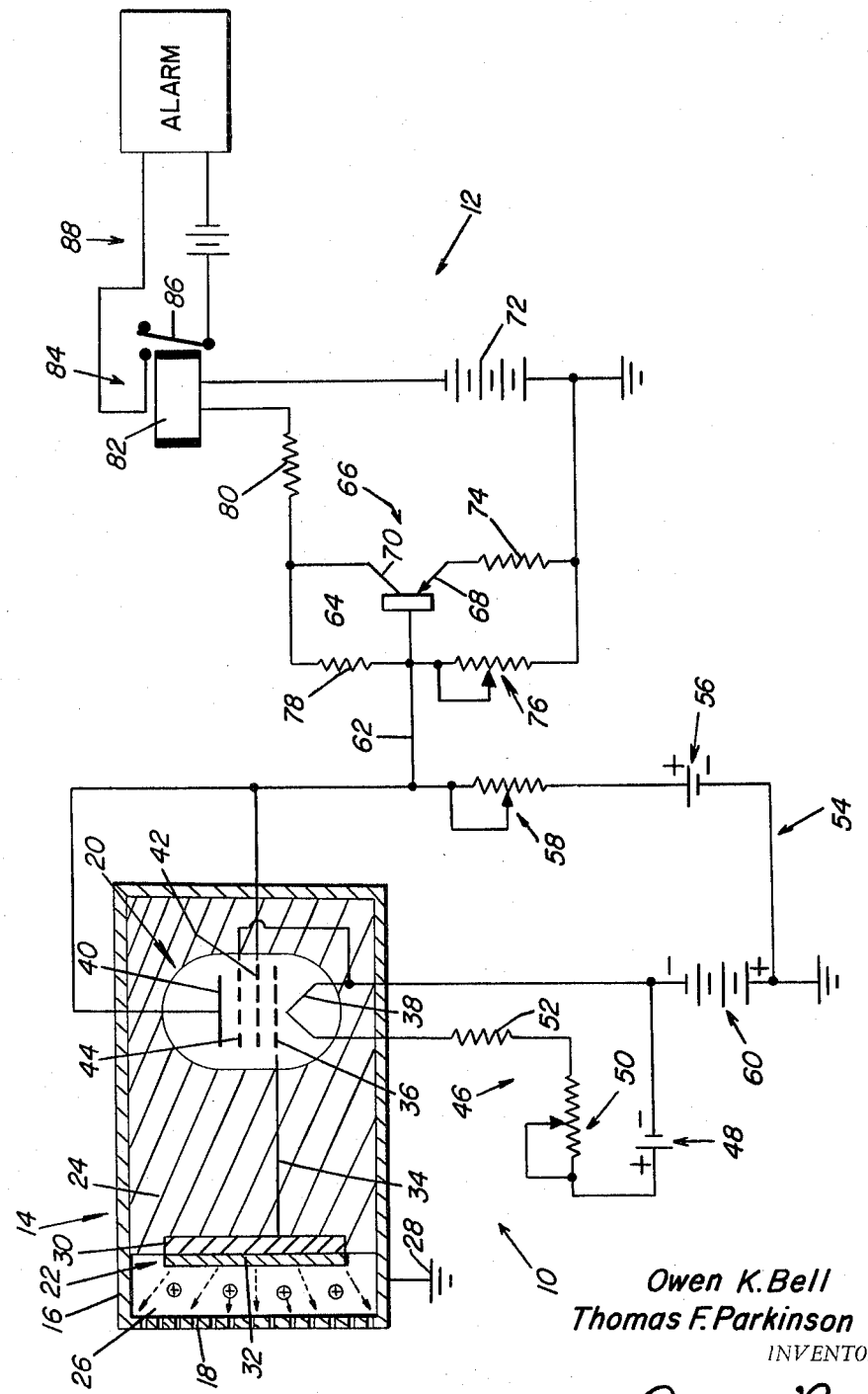

3,304,545
COMBUSTION PRODUCTS DETECTOR
Owen K. Bell, 2505 NW. 6th St., and Thomas F. Parkinson, 3930 SW. 5th Place, both of Gainesville, Fla. 32601
Filed Oct. 1, 1962, Ser. No. 227,180
4 Claims. (Cl. 340—237)

This invention relates to a new and useful method and apparatus for detecting early stages of combustion.

It is a primary object of the present invention to provide a highly sensitive early warning fire detector particularly useful in connection with the sensing of the early stages of combustion in connection with fire, circuit overloading, etc., and which detector is extremely simple and economical in cost when compared to fire detectors of comparable reliability and sensitivity.

Sensitive fire detecting systems have heretofore been devised which operate on the principle that early stage combustion products sharply reduce for a limited period of time, the ionization of air subjected to alpha particle emissions. Systems heretofore devised in accordance with the foregoing principle, measure the aforementioned reduction in the ionization of air by establishing an electrical field of predetermined potential within which said air ionization is produced and measuring the difference in the flow of current which occurs through said electrical field by virtue of the change in the conductivity of the ionized air produced by the presence or absence of the early stage combustion products. It was accordingly found necessary in order to produce any reliable detection of early stage combustion products to provide two radiation chambers within which air is ionized, only one of said chambers being adapted to receive the early combustion product particles for comparison and detection purposes. Accordingly, the equipment or apparatus involved in connection with such prior detecting systems were both costly and less reliable because of the number of components involved as compared to the system of the present invention.

In accordance with the principles of the present invention, no electrical field of fixed potential is established within the ionization chamber as in prior systems but rather, a variable electrostatic potential produced by virtue of the varying degree of ionization of the air within the ionization chamber, is measured and compared when the early stage combustion products are present so as to thereby produce an alerting signal in response only to the presence of the early stage combustion products. In this manner, the fire detecting device of the present invention is restricted to a single ionization chamber and a single alpha emitting plate member and is nevertheless capable of producing the early stage warning signal with the requisite degree of sensitivity and reliability.

Referring now to the single figure of the drawing in detail, it will be observed that the early stage combustion detecting system includes a detecting component generally referred to by reference numeral 10 which is operatively connected to a signal alerting component 12. The detecting component 10 includes a sensing unit 14 which may be enclosed within a casing or housing 16 one wall of which is provided with minute apertures, or openings 18 of such size as to admit early combusiton product particles. The openings in the front wall may therefore be formed in any suitable manner such as by a screen or mesh material. Mounted within the housing 16 spaced from the apertured end thereof, is an electrometer pentode tube device 20. The pentode 20 is embedded within any suitable potting material such as beeswax so that it may be installed in fixed spaced relation to an alpha particle emitter 22 deposited on a plate 30. The plate 30 is mounted by the potting material 24 in spaced relation to the apertures 18 so as to define an ionization chamber 26 within the housing 16. The ionization chamber 26 is grounded at the ground 28. The alpha emitter coating one face of conductor plate member 30 exposed to the chamber space is preferably some radioactive substance such as uranium 238 referred to by reference numeral 32 which has a long half life and little or no gamma ray emission as is well known by those skilled in the art. The enlarged surface plate 30 is electrically connected by means of the conductor 34 to the control grid 36 of the pentode 20. The control grid 36 is therefore disposed within the charge space of the tube 20 adjacent to a directly heated cathode 38. Also disposed between the cathode 38 and the anode 40 is a screen grid 42 arranged to reduce the electrostatic influence of the anode in the space between the cathode and the control grid for which reason it is connected to the anode circuit for establishing a predetermined potential thereon. Also, the pentode is provided with a suppressor grid 44 electrically connected to the cathode so as to prevent passage of electrons between the anode and the screen grid. Accordingly, the thermionic tube device 20 is rendered highly sensitive to variation in the potential applied to the control grid by virtue of a change in the electrostatic field potential in the ionization chamber 26 caused by the attraction of positive ions therein to the grounded electrode 28 as diagrammatically illustrated. A floating grid circuit is thereby established assuming a voltage determined by a balance between the positive ion flow in chamber 26 and the electron flow from the cathode 38 to the anode 40 of the electrometer tube device 20.

The cathode 38 is controllably heated by means of a cathode circuit 46 which includes the source of potential 48, the positive terminal of which is connected through potentiometer 50 and resistor 52 to one terminal of the cathode, the other terminal of the cathode being connected to the negative terminal of the potential source 48. A control potential is also applied to the anode 40 by means of the anode circuit 54 which includes a second source of potential 56 having a positive terminal connected through the potentiometer device 58 to the anode, and the screen grid 42, the negative terminal of the potential source 56 being connected to the grouded positive potential of the battery 60. The negative terminal of the battery 60 in turn is connected to the negative terminal of the cathode 38.

The anode circuit 54 is connected by means of the conductor 62 to the base 64 of a current amplifying transistor 66 which also includes an emitter 68 and collector 70. Thus, the transistor 66 will be operative to amplify the signal current produced in the anode circuit in order to produce an energizing current in the alerting component 12. The component 12 is therefore provided with a battery source of potential 72 having a grounded terminal connected in parallel to the emitter 68 and the base 64 by means of the resistor 74 and potentiometer 76, respectively. Also connected between the base and the collector is the resistor 78. The emitter-collector circuit is also provided with the resistor 80 connected in series with the energizing coil 82 of an alarm relay 84 which also includes the relay switch 86. The relay switch 86 is therefore adapted to close an alarm circuit 88 upon energization of the relay coil 82 when the emitter-collector circuit is operative to conduct an energizing current when the transistor 66 is rendered conductive by a signal current applied thereto through the conductor 62.

From the foregoing description, operation of the fire detecting system will become apparent. It will therefore be appreciated that the cathode 38 which is directly heated by its own controllable cathode circuit 46, would produce a controlled electron flow with respect to the anode 40 also provided with its own controllable source of positive potential. The control grid 36 being connected to the alpha emitter 22 and encapsulated in the potting material would tend to reduce the space charge in the pentode 20 and prevent conductivity therethrough because of the ionization within the chamber 26 and the resulting electrostatic field potential applied to the control grid as aforementioned. When, however, heavier particles of early stage combustion products enter the ionization chamber 26, a reduction in the ionization occurs because of alpha particle absorption by the heavier particles and their slower movement increasing the probability of neutralization. The potential on the control grid is thereby reduced so as to render the pentode more conductive, producing a signal current flow in the anode circuit connected to the base of the transistor 66 so as to render the transistor conductive. An amplified energizing current is thereby established through the relay 84 so as to close the alarm circuit 88.

With the foregoing arrangement of a detecting system, it has been found that a simplified yet reliable and sensitive alert may be provided in connection with the early stages of combustion utilizing a single alpha emitter and ionization chamber. Therefore, not only does the system of the present invention significantly reduce the cost of the early fire warning system but enables the construction of a detector device in a very compact form so as to render it ideal for use in connection with a wider variety of installations.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to falling within the scope of the invention as claimed.

What is claimed as new is as follows:

1. A system for detecting the presence of particles suspended in air produced by the early stages of combustion comprising, ionization chamber means for receiving air and particles within a single enclosed space, radiation emitting surface means mounted in said chamber means for ionizing the air therein, a thermionic device operatively connected to said radiation emitting surface means for balancing the ion flow produced by the ionization of air within said enclosed space at a predetermined electrostatic potential, and means responsive to reduction in said electrostatic potential for producing a detection signal, said means for producing a detection signal comprising current amplifying means operatively connected to said thermionic device for amplifying current produced therein by said reduction in said electrostatic potential and relay operated alarm means operatively connected to said current amplifying means energized in response to said amplified current, said thermionic device comprising an electrometer tube potted in fixed relation to said radiation emitting surface means, having an anode directly connected to the current amplifying means, a directly heated cathode and a control grid connected to the radiation emitting surface means for maintaining electron flow between the cathode and the anode balancing said ion flow within the enclosed space in the absence of the particles suspended in the air.

2. The combination of claim 1, wherein said radiation emitting surface means comprises an enlarged conductive plate connected to said control electrode and coated on a side thereof exposed to said chamber means with a radioactive, alpha emitting substance.

3. A detector unit for detecting the presence of particles in the air comprising, a single ionization chamber adapted to receive the air with said particles therein, a plate exposed to said chamber, means grounding the chamber to establish a potential on said plate in response to ionization of the air in said chamber, an electrometer tube having a cathode, an anode and a grid, means connecting said grid only to the plate in a floating grid circuit, an alpha emitter deposited on said plate in the chamber for ionizing the air therein, means for establishing a controlled electron flow between the cathode and the anode to balance the ion flow in said chamber produced by said ionization of the air therein by the alpha emitter, and means connected directly to the anode for producing an alarm in response to reduction in the ion flow in the chamber.

4. The combination of claim 3 wherein said electrometer tube and connecting means to the plate are encapsulated by a potting material.

References Cited by the Examiner

UNITED STATES PATENTS

| 1,856,392 | 5/1932 | Kevelson. | |
| 2,408,051 | 9/1946 | Donelian | 340—237 |
| 2,702,898 | 2/1955 | Meili | 340—237 |
| 2,809,317 | 10/1957 | Meili | 340—237 X |
| 3,018,376 | 1/1962 | Vanderchmidt | 250—83.6 |
| 3,023,368 | 2/1962 | Erath | 330—28 X |
| 3,028,490 | 4/1962 | Giulleux | 250—83.6 X |
| 3,271,756 | 9/1966 | Crawford et al. | 340—237 |

FOREIGN PATENTS 398,722   9/1933   Great Britain.

OTHER REFERENCES

Jachter et al.: Nucleonics; "Encapsulation Makes Monitor Independent of Environment," September 1957, pp. 148, 150, 151.

NEIL C. READ, *Primary Examiner.*

D. K. MYER, *Assistant Examiner.*